30-47 SR
3/10/87 RE 32,367

United States Patent [19]

Bowman et al.

[11] E Patent Number: Re. 32,367

[45] **Reissued Date of Patent:* Mar. 10, 1987**

[54] DISPOSABLE RAZOR WITH SLIDING CAP

[75] Inventors: Peter Bowman, Sandy Hook, Conn.; Allan S. Frieze, Alpine, N.J.

[73] Assignee: Warner Lambert Company, Morris Plains, N.J.

[ * ] Notice: The portion of the term of this patent subsequent to May 11, 1999 has been disclaimed.

[21] Appl. No.: 755,370

[22] Filed: Jul. 15, 1985

Related U.S. Patent Documents

Reissue of:

[64] Patent No.: 4,443,938
Issued: Apr. 24, 1984
Appl. No.: 359,341
Filed: Mar. 18, 1982

U.S. Applications:

[63] Continuation-in-part of Ser. No. 108,747, Dec. 31, 1979, Pat. No. 4,328,615.

[51] Int. Cl.[4] ..... B26B 21/06

[52] U.S. Cl. ..... 30/47; 30/84

[58] Field of Search ..... 30/47, 84, 30, 31

[56] References Cited

U.S. PATENT DOCUMENTS

| | | | |
|---|---|---|---|
| 2,576,618 | 11/1951 | Mansfield | 30/31 |
| 3,492,722 | 2/1970 | Sieve | 30/47 |
| 3,613,234 | 10/1971 | Gumbmann | 30/31 |
| 3,703,764 | 11/1972 | Perry | 30/47 X |
| 3,754,325 | 8/1973 | Tornvall | 30/30 |
| 4,011,656 | 3/1977 | Liedtke | 30/30 |

FOREIGN PATENT DOCUMENTS

| | | | |
|---|---|---|---|
| 54-378 | 1/1979 | Japan | 30/47 |

*Primary Examiner*—Jimmy C. Peters
*Attorney, Agent, or Firm*—Bachman & LaPointe

[57] ABSTRACT

A plastic disposable razor having one or more blades with a movable permanently attached sliding cap or cover for exposing and protecting the blade edge selectively.

24 Claims, 6 Drawing Figures

DISPOSABLE RAZOR WITH SLIDING CAP

Matter enclosed in heavy brackets [ ] appears in the original patent but forms no part of this reissue specification; matter printed in italics indicates the additions made by reissue.

BACKGROUND OF THE INVENTION

This application is a continuation-in-part of copending application Ser. No. 108,747 filed Dec. 31, 1979, by Peter Bowman and Allan S. Frieze, now U.S. Pat. No. 4,328,615, issued May 11, 1982 entitled RAZOR BLADE ASSEMBLY WITH MOVABLE COVER CAP.

The principal prior art over which this invention is an improvement is cited in said copending application, the most pertinent of which are U.S. Pat. Nos. to: King 1,287,338, Pinter 2,122,263 and Cutler 2,744,319.

King '338 shows a safety razor with a blade guard. The guard is removable and reversible; in one position of the guard, the blade edge is exposed and the razc. is operable. In the reversed position, the guard protects the blade edge.

Pinter '263 shows a scraper device including a blade for removing paint spots accidentally applied to glass. The device includes a "trunk buckle" latch or an "over center" lever for moving a protective plate to and fro over the edge of the blade to expose or protect the blade, as desired.

Cutler '319 shows a carrier for a double edge razor blade which is removable and reversible relative to the razor body. In one position of the carrier, a first blade edge is exposed and the second blade edge is covered. In the reversed position of the carrier, the first blade edge is covered and the second blade edge is exposed.

SUMMARY OF THE INVENTION

The present invention provides a novel disposable razor of all-plastic construction, save the blade package, which is of relatively simple design and susceptible of high-speed mass production methods necessary for commercial success in the disposable razor market.

The razor consists essentially of a handle molded integrally with a blade seat or blade package platform to define a single piece-part. The second plastic piece-part is a sliding blade or cap cover. Thus, if the blade package is treated as a separate entity, the razor is basically composed of three elements, i.e., a plastic sliding cover, a combined plastic handle and blade support, and a blade package.

Note that the term "blade package" or blade means is intended to denote one or more single edge blades.

Therefore a razor embracing certain features of the present invention may comprise a plastic handle including a contiguous seat member for supporting blade means, said handle and seat member defining a single piece-part, blade means carried by said seat member and a plastic cap slidable on said seat member, said cap and said seat member being formed with interlocking elements which facilitate relative motion through a definite stroke between the cap and the seat member while precluding separation of the cap and seat member.

BRIEF DESCRIPTION OF DRAWINGS

Other features and advantages of the invention will become more apparent from an examination of the succeeding specification when read in conjunction with the appended drawings, in which.

DESCRIPTION OF THE PREFERRED EMBODIMENT

Figure 1:
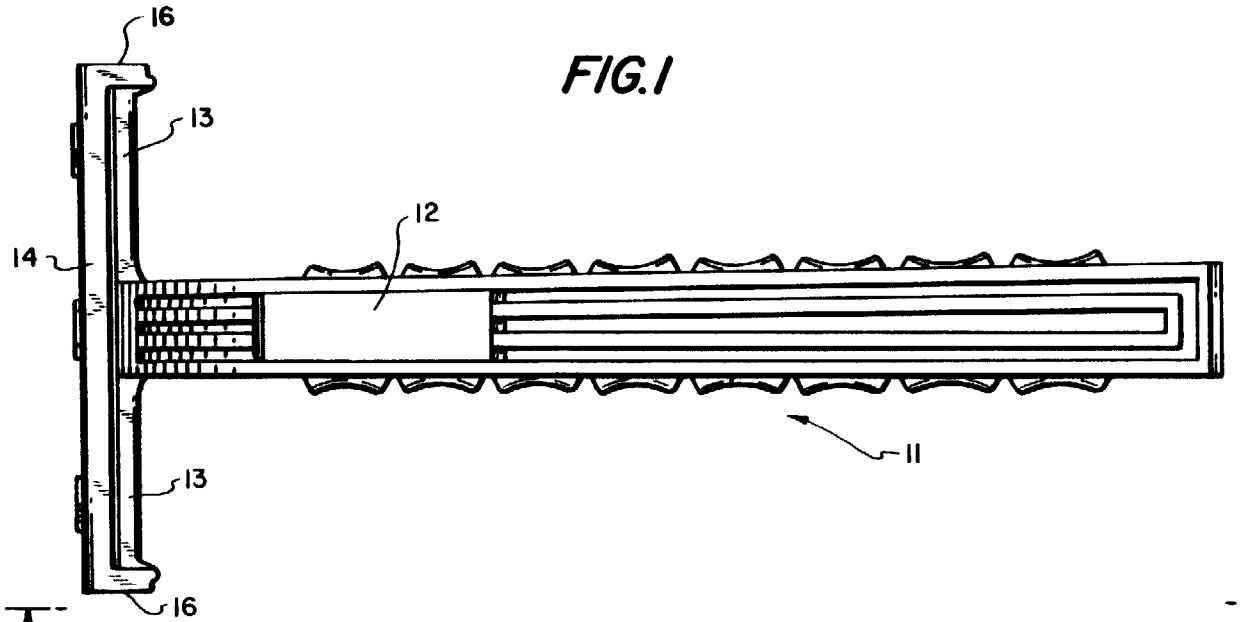
FIG. 1 is a plan view of the back side of the razor.

Referring now to the drawings, the reference numeral 11 designates a plastic disposable razor having a handle 12 formed integrally (molded) with a blade seat member 13, a blade package B and a sliding cap or blade cover 14 having side walls 16—16.

The side walls 16—16, defining flexible flanges, are formed with exterior serrations or ribs 17 to generate friction during manual grasping as will be more apparent hereinafter.

Figure 2:
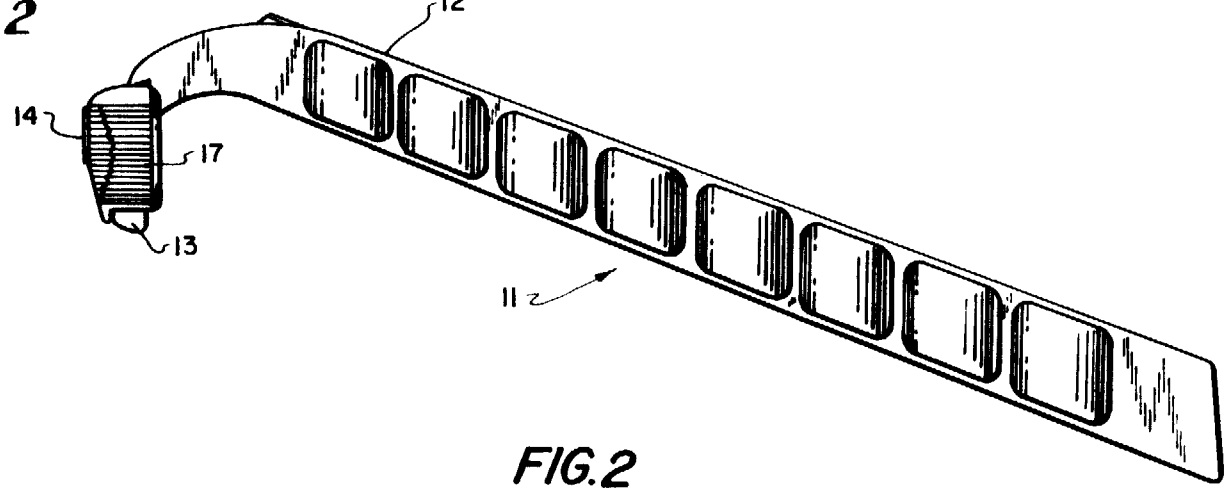
FIG. 2 is a side view of FIG. 1 as observed in the direction of the arrows 2—2.
Figure 3:
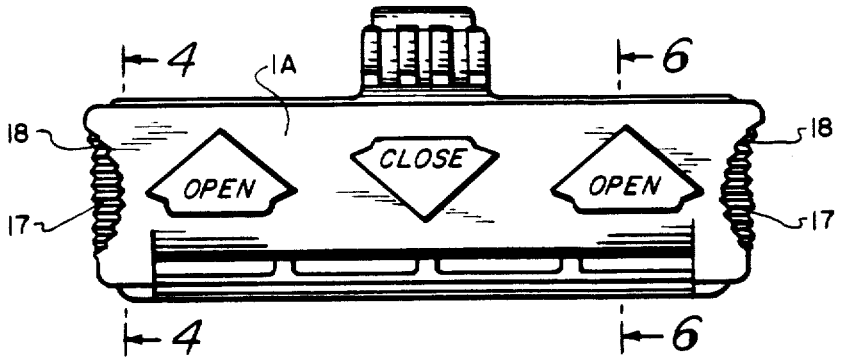
FIG. 3 is a top plan view of the razor.

The serrations extend substantially throughout the cap side walls and run into the top surface of the cap as is most apparent in FIGS. 2 and 3.

The junction of the top surface and each side wall is formed with an arcuate cut-out which in combination with the serrations 17 provides comfortable locations for grasping the cap 14 manually.

The cap 14 is formed with a block 19 having a face 21 molded with two spaced recesses 20–22. The cap also has a pair of claws or lugs 23—23 molded integrally with side walls or flexible flanges 16.

The face 21 of block 19 and the shoulders 24—24 of the claws define a track or guide which straddles a rail 26 formed on each end of the blade seat member 13. The rail 26 has a face or shoulder 30 which is in face-to-face contact with shoulders 24—24.

The rail 26 is formed with a protuberance 27 which interlocks selectively with recesses 20 and 22 of the block as the cap 14 is moved relative to the seat member 13 through a definite stroke from a first position in which the blade package is exposed for shaving (see solid line position of cap in FIG. 6) to a second position in which the blade package is covered (dotted line position of cap).

It is entirely within the contemplation of the invention that the location of the protuberance 27 and the recesses 20 and 22 be reversed, i.e., protuberance on the block 19 and recesses on rail 26. Correspondingly, the position of the rail, the claws and the block could be reversed, i.e., rail on cap and block and claws on blade support.

The blade package B which in the present embodiment includes two blades 31 and 32 and blade spacer 33 is secured to the seat member 13 by means of plastic rivets 34—34 molded integrally with the seat member and subsequently "upset" to form heads 36—36 in well known fashion.

Figure 5:
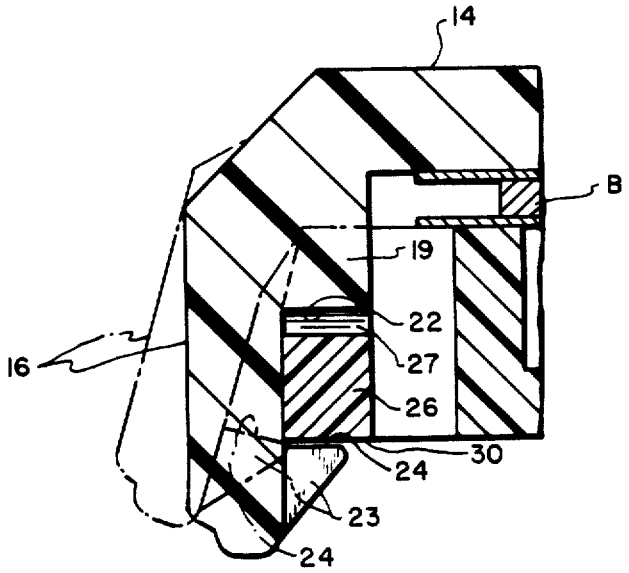
FIG. 5 is a sectional view of a portion of the illustration of FIG. 4 as viewed in the plane of the line 5—5 and in the direction of the arrows.

The cap 14 is assembled to the blade package B and seat member 13 by placing the cap in proper register and pressing the cap down upon the seat member so that side walls 16—16 flex outwardly and thence inwardly as shown in FIG. 5 to effect a snap-on action and as described in greater detail in said copending application.

Figure 4:
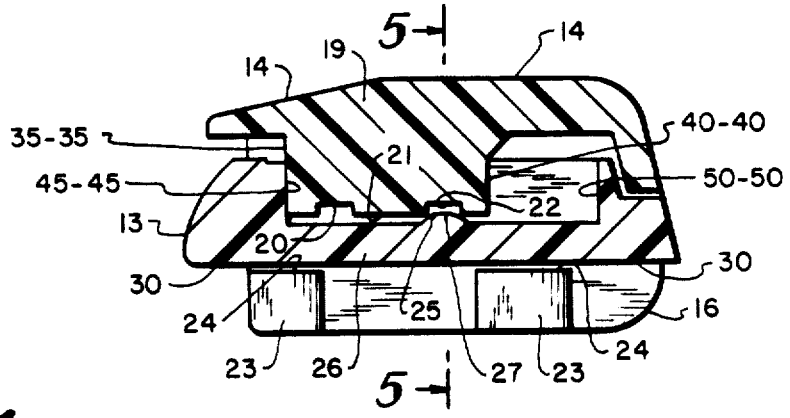
FIG. 4 is a sectional view of FIG. 3 as viewed in the plane of line 4—4 and in the direction of the arrows.
Figure 6:
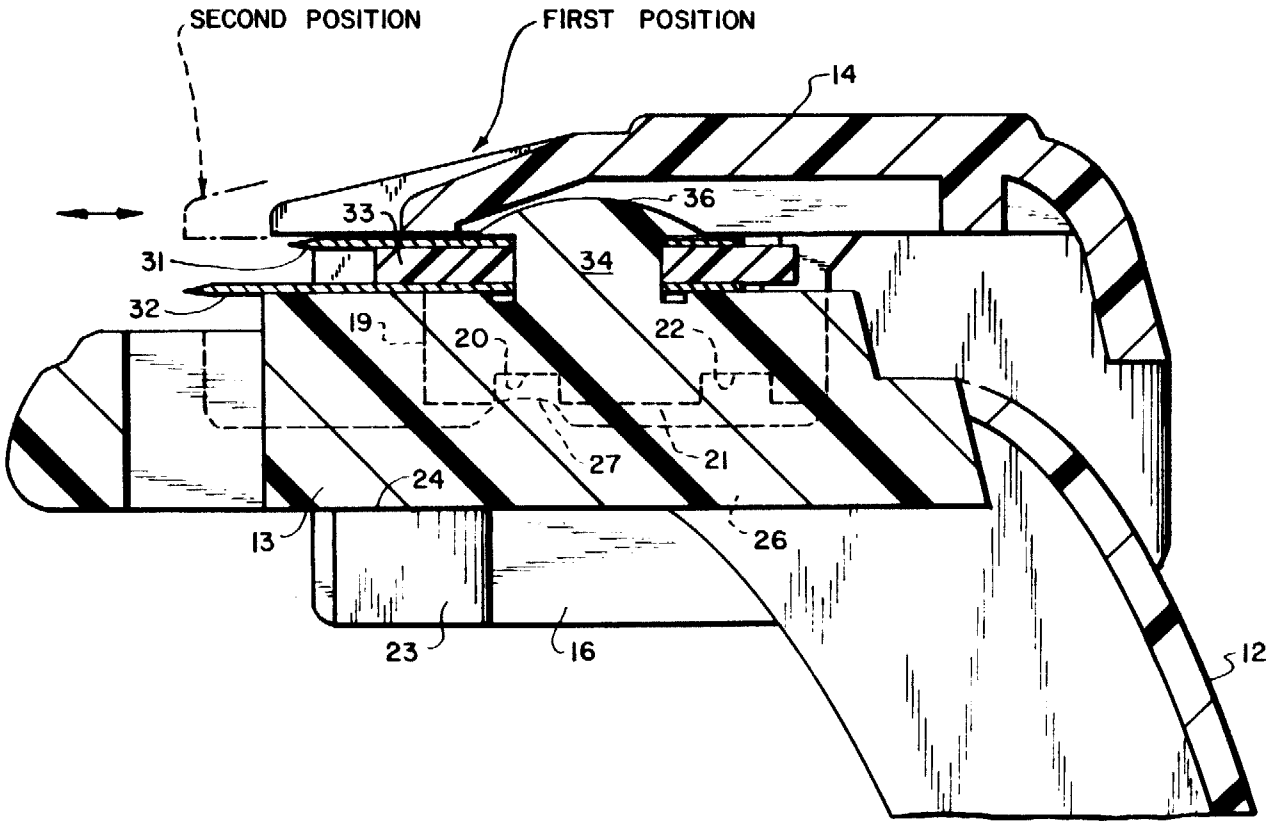
FIG. 6 is a vertical section of the assembled razor taken in the plane of line 6—6 of FIG. 3 as viewed in the direction of the arrows.

The razors are shipped to point of sale with the cover 14 in the second or closed position (FIGS. 4 and 6). To avoid premature motion of the cover 14, the protuberances 27—27 are molded with a frangible nib 25 to block motion of the cap 14 during transit.

When the customer moves the cap 14 to the first position exposing the blade package for shaving, the rib is destroyed and has no further function or effect.

As is most apparent in FIG. 4, the stop members on the cap 14 are defined by the vertical faces 35—35 (forward faces) and 40—40 (rear faces) on the block 19.

Correspondingly, the stop members on the seat member are defined by the forward vertical walls 45—45 (which cooperate with vertical faces 35—35) and the after vertical walls 50—50 (which cooperate with vertical faces 40—40).

What is claimed is:

1. A disposable razor comprising a plastic handle and contiguous rigid seat member for supporting a blade package, said seat member having opposed rails, said handle and seat member defining a single piece-part, blade means carried by and permanently fixed to said seat member, and a flexible plastic cap slidable on said seat member along said rails, said cap and said seat member being formed with interlocking elements which effect a snap-on action creating a snap fit between the cap and seat member and facilitating relative motion between the cap and the seat member through a definite stroke between a first and a second position while precluding separation of the cap and seat member, wherein the blade support and the cap are formed with cooperating detent means which relatively and releasably lock the cap in the first or second position.

2. The razor of claim 1 in which said interlocking members include flexible flanges on said cap terminating in claws cooperating with said rails.

3. The razor of claim 2 in which interlocking members include a block on one of said cap and said seat member, said block having spaced recesses, and mating protruberances formed on the other of said cap and said seat member, the spacing of said recesses corresponding to said definite stroke.

4. The razor of claim 3 in which said block and said claws are formed on said cap and define a track which engages a mating rail.

5. A razor comprising a plastic handle including a contiguous rigid seat member for supporting blade means, said handle and seat member being molded integrally to define a single piece-part, said seat member having opposed rails, blade means carried by said seat member and a flexible plastic cap slidable on said seat member and fixed thereto, said cap and said rails being formed with interlocking shoulders which cooperate to connect the cap and seat member to preclude separation, said shoulders on one of said cap and said rails being carried by a flexible element to effect a snap-on action, said cap being movable from a first position in which said blade means is exposed properly for wet shaving to a second position in which said blade means is covered and the razor is totally inoperative, wherein the blade support and the cap are formed with detent means which lock the cap releasably in the first or second position.

6. The razor of claim 5 in which one of said cap and said rails are formed with cooperating cam surfaces operative to provide cam action to facilitate interlocking said shoulders.

7. The razor of claim 6 in which the cap is formed with opposed end flanges terminating in retaining lugs, said lugs being resiliently supported by said cap operative to be displaced by said cam action, wherein said lugs are arranged in pairs and each lug includes a cam surface and a shoulder.

8. The razor of claim 7 in which the cap and seat member are provided with cooperating stop means for limiting the stroke of the cap relative to the seat member.

9. Razor blade assembly for a razor comprising two support elements, each coming into contact in one area with the skin, and having between said support elements at least one blade which is held on the first of said support elements and whose cutting edge can be covered when the razor is not being used, characterized in that the blade is rigidly connected with the first support element, that when the assembly comprising the first support element and the blade attached thereon is firmly held, the second support element can be adjusted in relation thereto, transversely to the longitudinal extension of the support elements, in at least two discrete positions such that the cutting edge of the blade can be selectively exposed or covered, the first and the second support elements engage one another by means of slide surfaces disposed along the lateral edges of support elements defining a portion of these edges, and recesses and complementary projections disposed beside the sliding surfaces on the support elements form, through their interaction, detenting means for the end positions of the second support element.

10. Razor blade assembly according to claim 9 characterized in that when the razor is set for shaving, the plane tangential to the skin-engaging areas of the first and second support elements is pierced in outward direction by the cutting edge of the at least one blade, while, when covered by the second support element, the cutting edge is behind the corresponding tangential plane.

11. Razor blade assembly according to claim 9, characterized in that the second support element is guided parallel to the surface of the blade next to it.

12. Razor blade assembly according to claim 9, characterized in that the surfaces adjacent to the slides are formed as complementary inclined camming surfaces which, coacting with the resiliency of the material used for at least one of the support elements, allow the support elements to snap into engagement when pressed together during assembly of the razor blade set.

13. Razor blade assembly according to claim 9, characterized in that the first support element including a guard bar is the seat member for the blade, and that the second support element forms a movable cap member whose lateral surfaces extend down along the lateral margins of the seat member.

14. A razor blade assembly comprising:

a seat member having a continuous skin-engaging guard along the forward margin thereof and having an upwardly facing blade support surface, said seat member being arranged to be fixedly held by a handle extending transversely relative to the blade support surface;

a razor blade rigidly and permanently fixed to said seat member with its cutting edge forwardly directed and spaced rearwardly of said guard; and a cap permanently mounted on said seat member above said blade, said cap and seat member being formed with interlocking elements which allow sliding motion of the cap relative to the seat member in a fore-and-aft direction through a definite stroke between a first position in which the blade edge is in front of the cap and is exposed for shaving, and a second inoperative position in which the cap shields the blade edge from inadvertent external contact, and detenting means for releasably retaining the cap in each of said positions.

15. The razor blade assembly of claim 14 wherein said [lower blade supporting means] *blade support surface* includes an integral elongated razor handle portion depending therefrom.

16. The razor blade assembly of claim 14 wherein ends of said seat member which extend rearwards from said forward margin provide opposed rails, and wherein said interlocking elements include flanges on said cap terminating in lugs slidable along said rails, said flanges being flexible to allow the cap to be snapped into place on the seat member.

17. The razor blade assembly of claim 16 wherein one of said rails and/or lugs are provided with cam surfaces to spread said flanges while the cap is snapped into place on the seat member.

18. The razor blade assembly of claim 14 in which the cap and seat member are provided with stop means which cooperate with said detenting means to define the stroke of the cap on the seat member.

19. The razor blade assembly of claim 14 wherein said detenting means comprises at least one recess in one of said cap and said seat member and at least one complementary projection on the other of said cap and said seat member, said cap and seat member being of resilient plastic, and said complementary projection being positioned for resilient biased engagement with said cap recess.

20. A razor blade assembly comprising:

lower blade supporting means, said lower blade supporting means including a seat member having a skin-engaging guard surface along the forward margin thereof and an upwardly facing planar support surface;

at least one razor blade having a cutting edge;

means rigidly and permanently connecting with at least one razor blade in fixed supported engagement with said planar support surface, said at least one razor blade cutting edge being forwardly directed; and blade cover means comprising a cap member disposed above said at least one razor blade and having a forward margin and being movably retainedly connected to said seat member, said cap member being movable in a fore-and-aft direction relative to said at least one razor blade and said planar support surface between a first position in which said at least one razor blade cutting edge extends forwardly beyond a plane tangent to forward margins of said cap member and said guard surface for shaving and a second position in which said tangent plane is relatively moved to a position forward of said at least one razor blade cutting edge thereby to effectively remove said at least one razor blade cutting edge from inadvertent external contact, wherein said cap member and said seat member include complementary detenting means for releasably retaining said cap member at each of said first and second positions, said detenting means comprising first engaging means on each end of one of said cap member and said seat member for releasably engaging second and third engaging means respectively on each end of the other of said cap member and said seat member when said cap member is in said first and second positions respectively.

21. A disposable razor comprising:

a seat member integrally formed with and extending transversely of a handle so that the seat member and handle form a single part, said seat member having a continuous skin-engaging guard along the forward margin thereof and having an upwardly facing blade support surface, said seat member also having end portions providing rails which extend rearwards from said forward margin, a blade means fixed to said seat member with its cutting edge forwardly directed and spaced rearwardly of said guard, and a cap permanently mounted on said seat member above said blade, said cap having flanges which terminate in lugs slidable along said rails, said flanges and lugs being a snap fit on said rails, and said flanges and rails being provided with cooperating means which allow for manual movement of the cap through a definite stroke between first position in which the blade edge is in front of the cap and is exposed for shaving, and a second position in which the cap shields the blade edge from inadvertent external contact, detenting means being provided for releasably retaining the cap in each of said positions.

22. A disposable razor according to claim 21 wherein the only parts of the razor additional to the blade means are the said single part comprising handle and seat member, and the cap, both said additional parts being integral moldings of plastic material.

23. A disposable razor comprising a plastic handle and a contiguous seat member for supporting a blade package, said seat member having a skin-engaging guard, said handle, guard, and seat member defining a single piece-part, blade means rigidly and permanently fixed to said seat member, and a plastic cap permanently mounted on and slidable on said seat member, said cap and said seat member being formed with interlocking elements which facilitate relative motion between the cap and the seat member while precluding separation of the cap and seat member, said motion being in a fore-and-aft direction through a definite stroke between a first position in which the blade edge is in front of the cap and is exposed for shaving, and a second inoperative position in which the cap shields the blade edge from inadvertent external contact, detenting means being provided for releasably retaining the cap in each of said positions.

*24. A razor blade assembly comprising:*

*a seat member having a continuous skin-engaging guard along the forward margin thereof and having an upwardly facing blade support surface, said seat member being arranged to be fixedly held by a handle extending transversely relative to the blade support surface;*

*a razor blade rigidly and permanently fixed to said seat member with its cutting edge forwardly directed and spaced rearwardly of said guard; and*

*a cap permanently mounted on said seat member above said blade, said cap and seat member being formed with interlocking elements which allow relative sliding*

*motion of the cap and the seat member in a fore-and-aft direction through a definite stroke between a first position in which the blade edge is in front of the cap and is exposed for shaving, and a second inoperative*

*position in which the cap shields the blade edge from inadvertent external contact, and detenting means for releasably retaining said first and second positions.*

* * * * *